(12) United States Patent
Shinji

(10) Patent No.: US 10,848,456 B2
(45) Date of Patent: Nov. 24, 2020

(54) SERVER DEVICE

(71) Applicant: Rakuten, Inc., Tokyo (JP)

(72) Inventor: Katsuhide Shinji, Tokyo (JP)

(73) Assignee: Rakuten, Inc., Tokyo (JP)

( * ) Notice: Subject to any disclaimer, the term of this patent is extended or adjusted under 35 U.S.C. 154(b) by 381 days.

(21) Appl. No.: 14/765,867

(22) PCT Filed: Jun. 27, 2014

(86) PCT No.: PCT/JP2014/067234
§ 371 (c)(1),
(2) Date: Jun. 10, 2016

(87) PCT Pub. No.: WO2015/198484
PCT Pub. Date: Dec. 30, 2015

(65) Prior Publication Data
US 2016/0277353 A1    Sep. 22, 2016

(51) Int. Cl.
*H04L 12/58* (2006.01)
*G06F 13/00* (2006.01)
(Continued)

(52) U.S. Cl.
CPC ............ *H04L 51/36* (2013.01); *G06F 13/00* (2013.01); *H04L 51/20* (2013.01); *H04L 51/24* (2013.01);
(Continued)

(58) Field of Classification Search
CPC ......... H04L 51/36; H04L 51/14; H04L 51/20; H04L 51/24; H04L 67/141; H04L 67/306; H04L 67/04; G06F 13/00
See application file for complete search history.

(56) References Cited

U.S. PATENT DOCUMENTS 6,684,248 B1 *  1/2004  Janacek ................. H04L 63/12
                                                      709/217
7,089,208 B1 *  8/2006  Levchin ................ G06Q 20/02
                                                      705/39
(Continued)

FOREIGN PATENT DOCUMENTS

JP            201426486 A       2/2014

OTHER PUBLICATIONS

International Search Report, issued by International Searching Authority in corresponding International Application No. PCT/JP2014/067234, dated Sep. 16, 2014.
(Continued)

*Primary Examiner* — Benjamin M Thieu
(74) *Attorney, Agent, or Firm* — Sughrue Mion, PLLC

(57) ABSTRACT

There is provided a message exchange service which can accept a message whose destination is a user who has not yet registered for the service and transmit, to the destination user, the message in a data format appropriate to the service in an ex post facto manner.

A server device accepts profile information from a user wishing to use the service to proceed with registration of the user to the service, receives and records a message whose destination is an unregistered user who has not yet registered for the service together with identification information to identify the destination user, and transmits the message to a new registered user if it is determined, based on the profile information accepted from the new registered user and the identification information, that the new registered user who has registered for the service after the receipt of the message corresponds to the destination user.

12 Claims, 7 Drawing Sheets

(51) Int. Cl.
*H04L 29/08* (2006.01)
*H04L 29/06* (2006.01)

(52) U.S. Cl.
CPC .......... *H04L 67/141* (2013.01); *H04L 67/306* (2013.01); *H04L 67/42* (2013.01)

(56) References Cited

U.S. PATENT DOCUMENTS

| | | | | |
|---|---|---|---|---|
| 7,512,407 | B2* | 3/2009 | Wu | H04L 29/06 455/466 |
| 7,870,205 | B2* | 1/2011 | LeVasseur | H04L 63/126 709/206 |
| 8,538,028 | B2* | 9/2013 | Yeap | H04L 51/28 380/278 |
| 9,251,317 | B2* | 2/2016 | Xu | G06F 21/10 |
| 9,647,977 | B2* | 5/2017 | LeVasseur | H04L 63/126 |
| 2002/0091774 | A1* | 7/2002 | Imamura | G06Q 10/107 709/206 |
| 2003/0140103 | A1* | 7/2003 | Szeto | H04L 51/04 709/206 |
| 2003/0229670 | A1* | 12/2003 | Beyda | G06Q 10/107 709/206 |
| 2004/0152477 | A1* | 8/2004 | Wu | H04L 29/06 455/466 |
| 2008/0256196 | A1* | 10/2008 | Kamat | G06Q 10/107 709/206 |
| 2011/0055015 | A1* | 3/2011 | Gavita | G06Q 30/0264 705/14.61 |
| 2012/0191585 | A1* | 7/2012 | Lefebvre | G06Q 10/10 705/35 |
| 2013/0275530 | A1* | 10/2013 | Matson | H04L 51/24 709/206 |
| 2015/0046542 | A1* | 2/2015 | Yamamoto | H04L 12/1822 709/206 |
| 2015/0244654 | A1* | 8/2015 | Tsubota | G06Q 50/01 709/206 |
| 2015/0256679 | A1* | 9/2015 | Burnett | H04M 3/53366 379/88.12 |

OTHER PUBLICATIONS

Written Opinion issued by the International Bureau in corresponding International Application No. PCT/JP2014/067234, dated Sep. 16, 2014.

* cited by examiner

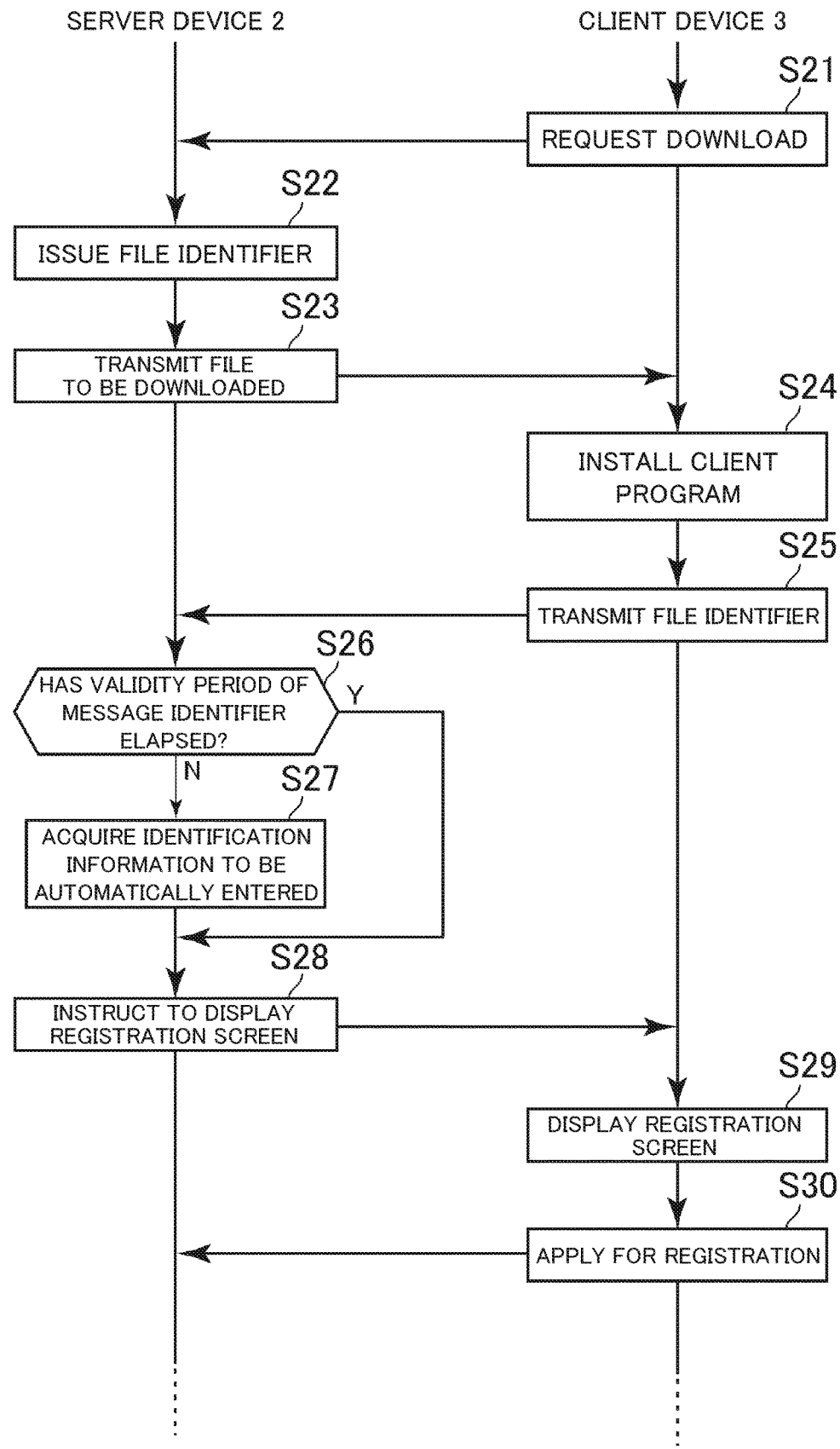

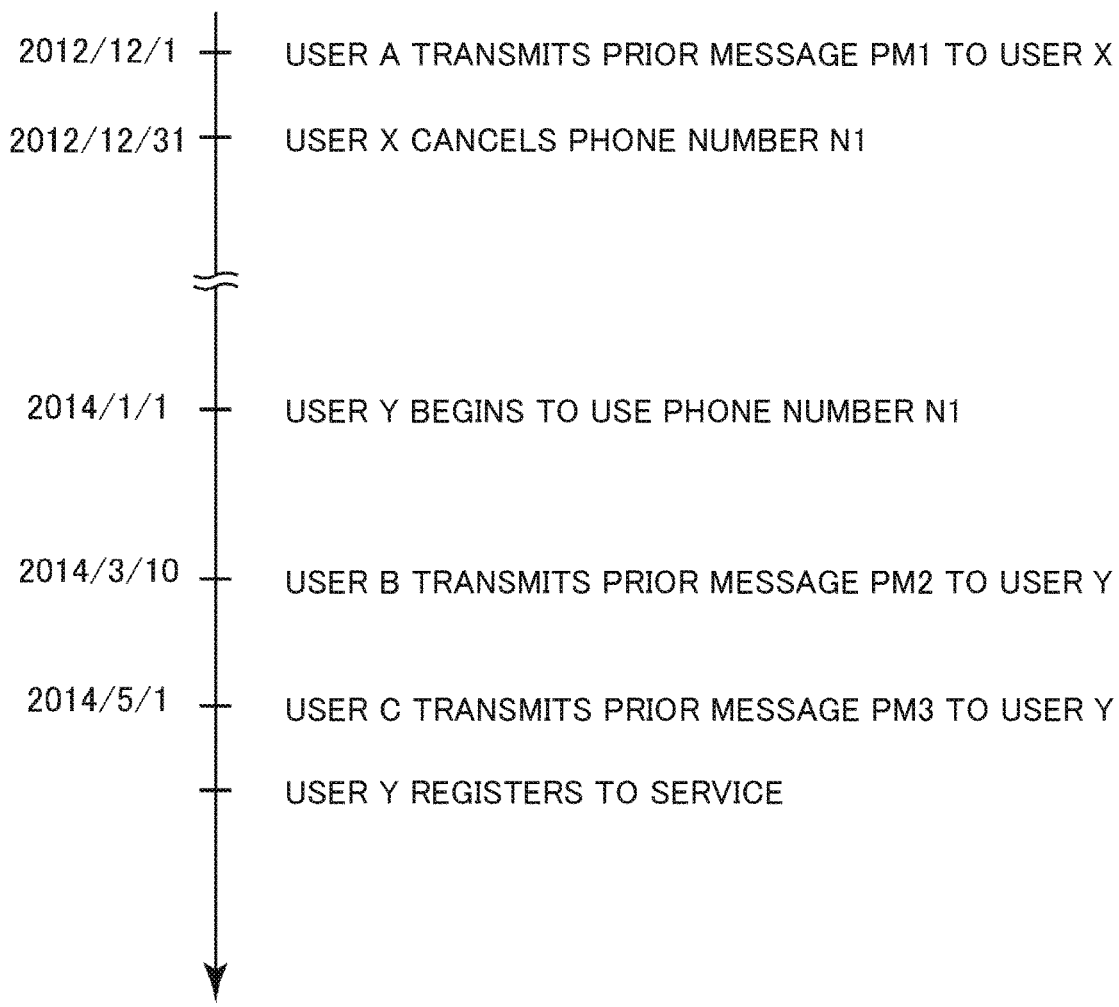

FIG7A

| MESSAGE IDENTIFIER | TRANSMITTING USER | PHONE NUMBER | MAIL ADDRESS | REGISTRATION FLAG |
|---|---|---|---|---|
| PRIOR MESSAGE PM1 | USER A | PHONE NUMBER N1 | MAIL ADDRESS A1 | UNREGISTERED |
| PRIOR MESSAGE PM2 | USER B | PHONE NUMBER N2 | MAIL ADDRESS A1 | REGISTERED |

FIG7B

| MESSAGE IDENTIFIER | TRANSMITTING USER | PHONE NUMBER | MAIL ADDRESS | REGISTRATION FLAG |
|---|---|---|---|---|
| PRIOR MESSAGE PM1 | USER A | PHONE NUMBER N2 | MAIL ADDRESS A1 | REGISTERED |
| PRIOR MESSAGE PM2 | USER B | PHONE NUMBER N2 | MAIL ADDRESS A1 | REGISTERED |

FIG8

| MESSAGE IDENTIFIER | TRANSMITTING USER | CONTACT | REGISTRATION FLAG |
|---|---|---|---|
| PRIOR MESSAGE PM1 | USER A | PHONE NUMBER N1 | UNREGISTERED |
| PRIOR MESSAGE PM1 | USER A | PHONE NUMBER N2 | UNREGISTERED |
| PRIOR MESSAGE PM1 | USER A | MAIL ADDRESS A1 | UNREGISTERED |
| PRIOR MESSAGE PM1 | USER A | MAIL ADDRESS A2 | UNREGISTERED |

SERVER DEVICE

CROSS REFERENCE TO RELATED APPLICATIONS

This application is a National Stage of International Application No. PCT/JP2014/067234 filed Jun. 27, 2014, the contents of all of which are incorporated herein by reference in their entirety.

TECHNICAL FIELD

The present invention relates to a server device for providing a message exchange service, and a control method and program thereof.

BACKGROUND ART

A variety of message exchange services are known which allow exchange of messages between client devices such as smartphones and personal computers. Some of these services permit exchange of not only messages that include ordinary text with no decoration but also those including a variety of information such as pictographs, still images, movies, voice messages, and device position information in an original data format between users (refer, for example, to PTL 1).

CITATION LIST

Patent Literature

PTL 1

Japanese Patent Laid-Open No. 2014-026486

SUMMARY

Technical Problem

If a user (hereinafter referred to as a transmitting user) attempts to send a message using the above service, it is common that the transmitting user registers to the service and installs an application program appropriate to the service into his or her client device. However, even when the transmitting user registers to the service, it is not possible for him or her to send a message in a unique format to a desired party if this party has not yet registered for the service.

The present invention has been devised in light of the foregoing, and it is an object of the present invention to provide a message exchange service which can accept a message whose destination is a user who has not yet registered for the service and transmit, to the destination user, the message in a data format appropriate to the service in an ex post facto manner.

Solution to Problem

A server device according to the present invention includes service registration means, message reception means, and message transmission means. The service registration means accepts profile information from a user wishing to use a message exchange service to proceed with registration of the user to the service. The message reception means receives a message whose destination user is an unregistered user who has not yet registered for the service together with identification information used to identify the destination user and then records the message. The message transmission means transmits the recorded message to a new registered user if it is determined, on a basis of the profile information and the identification information accepted from the new registered user, that the new registered user who has registered for the service after the receipt of the message corresponds to the destination user.

A server device control method according to the present invention includes a step of accepting profile information from a user wishing to use a message exchange service to proceed with registration of the user to the service. The server device control method further includes a step of receiving a message whose destination user is an unregistered user who has not yet registered for the service together with identification information used to identify the destination user and then recording the message. The server device control method still further includes a step of transmitting the recorded message to a new registered user if it is determined, on a basis of the profile information and the identification information accepted from the new registered user, that the new registered user who has registered for the service after the receipt of the message corresponds to the destination user.

A program according to the present invention causes a computer to function as service registration means, message reception means, and message transmission means. The service registration means accepts profile information from a user wishing to use a message exchange service to proceed with registration of the user to the service. The message reception means receives a message whose destination user is an unregistered user who has not yet registered for the service together with identification information used to identify the destination user and then records the message. The message transmission means transmits the recorded message to a new registered user if it is determined, on a basis of the profile information and the identification information accepted from the new registered user, that the new registered user who has registered for the service after the receipt of the message corresponds to the destination user. The program may be provided stored in a computer-readable information storage medium.

BRIEF DESCRIPTION OF DRAWINGS

FIG. 5 is a flowchart illustrating an example of processing flow when an unregistered user who has received a reception notice RN of the prior message PM registers to the service.

FIG. 6 is a diagram illustrating the chronological order of events that describe a first example of matching.

FIG. 7A is a diagram illustrating an example of identification information of the prior message PM in a second example of matching.

FIG. 7B is a diagram illustrating an example of updated identification information of the prior message PM in the second example of matching.

FIG. 8 is a diagram illustrating an example of identification information of the prior message PM in a third example of matching.

DESCRIPTION OF EMBODIMENT

A detailed description will be given below of an embodiment of the present invention with reference to the accompanying drawings.

Figure 1:
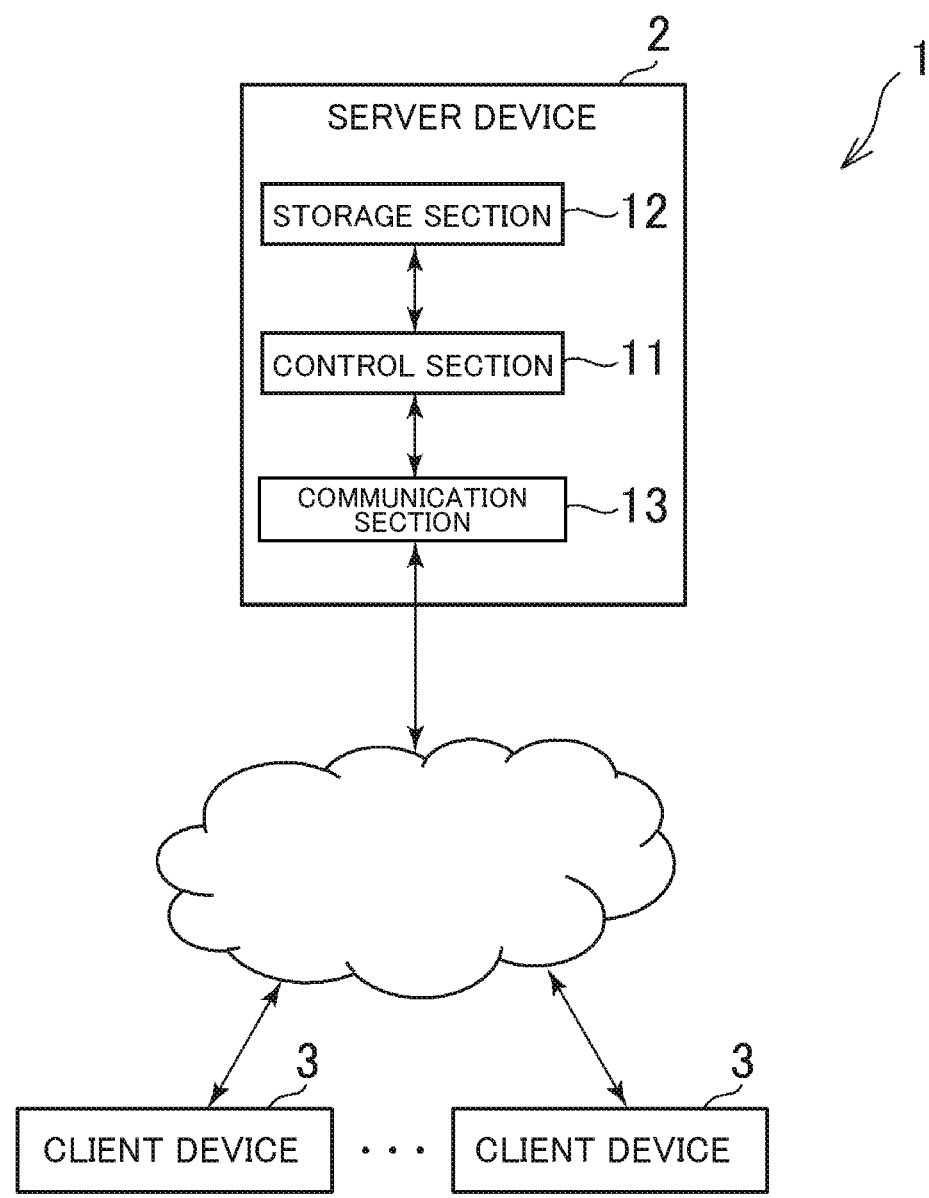
FIG. 1 is an overall configuration diagram of a service provision system that includes a server device according to an embodiment of the present invention.

FIG. 1 is an overall configuration diagram of a message exchange system 1 according to an embodiment of the present invention. As illustrated in FIG. 1, the message exchange system 1 includes a server device 2 according to an embodiment of the present invention and client devices 3. The server device 2 according to the present embodiment is a server computer adapted to provide a message exchange service (hereinafter referred to as the present service) and includes a control section 11, a storage section 12, and a communication section 13 as illustrated in FIG. 1. Each of the client devices 3 is an information processor such as smartphone, mobile phone, tablet, or personal computer which is used by a user of the present service.

The control section 11 is, for example, a CPU and handles a variety of information processing tasks in accordance with the program stored in the storage section 12. The storage section 12 includes memory elements such as RAM and stores the program executed by the control section 11 and data processed by the program. In the present embodiment in particular, the storage section 12 temporarily stores at least some of the messages to be exchanged in the present service.

The communication section 13 is a communication interface such as LAN card. The server device 2 exchanges data with each of the plurality of client devices 3 via the communication section 13. The server device 2 and the client devices 3 are connected in such a manner that they can communicate with each other via a variety of communication networks such as wireless LAN and the Internet.

Figure 2:
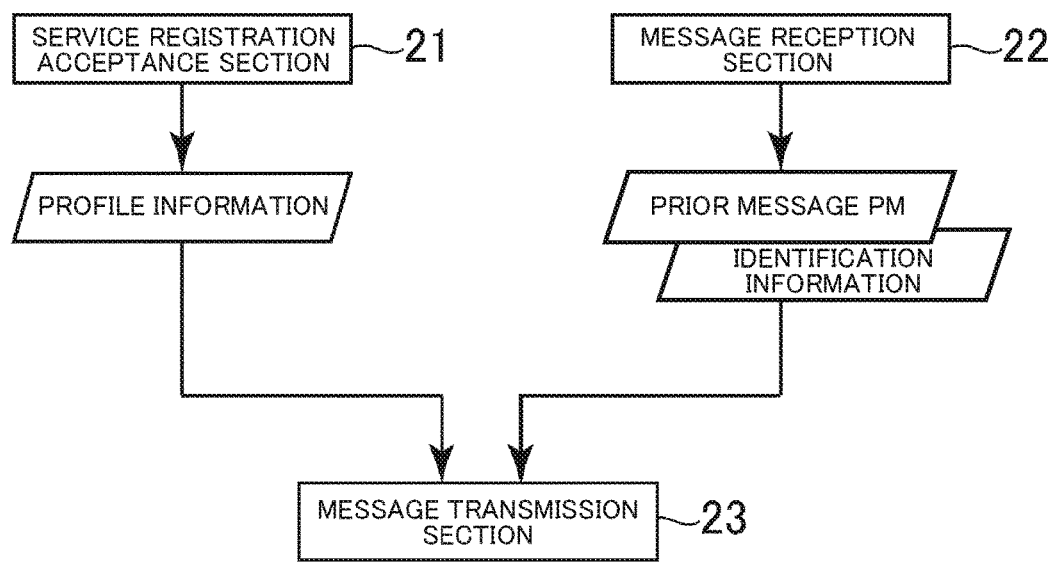
FIG. 2 is a functional block diagram of the server device according to the embodiment of the present invention.

A description will be given below of the functions implemented by the server device 2 in the present embodiment. The server device 2 functionally includes a service registration acceptance section 21, a message reception section 22, and a message transmission section 23 as illustrated in FIG. 2. These functions are implemented as a result of the control section 11 executing the program stored in the storage section 12. This program may be provided to the server device 2 in a manner stored in one of a variety of information storage medium such as optical disc. Alternatively, the program may be provided to the server device 2 via a communication network such as the Internet.

The service registration acceptance section 21 accepts a registration application from a user wishing to use the present service (hereinafter referred to as a user wishing to register for the service) to proceed with registration of the user to the service. More specifically, the service registration acceptance section 21 accepts, from a user wishing to register for the service, a registration application including profile information of the user and records the accepted profile information in a user database, thus registering the user to the service. It should be noted that, in the present embodiment, acceptance of profile information that can be used for matching with identification information which will be described later is a condition for completing the registration of a user to the service. For example, the service registration acceptance section 21 may accept part of information from a user wishing to register for the service for temporary registration of the user. However, the "service registration" in the description given below refers to a process in which the service registration acceptance section 21 accepts profile information used for matching with identification information from a user and registers the user to a user database. It should be noted that the server device 2 may assign a unique user ID to each of users wishing to register for the service and identify each user using the present service with the user ID. Alternatively, the server device 2 may identify each user using information unique to each user that is included in profile information. Here, as a specific example, we assume that profile information includes at least the phone number of the mobile terminal (e.g., mobile phone or smartphone) used by a user wishing to register for the service and that the server device 2 identifies each user with the phone number. Further, we assume that each user uses, as the client device 3, a mobile terminal which can receive a call at that phone number. It should be noted that profile information provided by a user wishing to register for the service may include not only a phone number but also personal information of the user wishing to register for the service such as his or her name, mail address, and birthday.

In the present embodiment, we assume that a user wishing to register for the service installs a dedicated application program appropriate to the present service into his or her client device 3. In the description given below, the dedicated application program will be referred to as a client program. A user wishing to register for the service installs the client program into his or her client device 3 and starts the program first, and then performs given operations in the client program to apply for registration to the present service.

The user who has gone through registration to the service can transmit messages to other users using the present service from this moment forward. In the description given below, a user whose registration to the service has been accepted by the service registration acceptance section 21 will be referred to as a registered user, and a message transmitted by a registered user using the present service will be denoted as a message M. Further, a user who transmits the message M using the present service will be referred to as a transmitting user, and a user who is specified as the destination of the message M as a destination user. In the present embodiment, we assume that the message M can only be transmitted by a registered user. Normally, the destination user of the message M is also a registered user.

A registered user wishing to transmit the message M creates the message M using the client program and transmits the message M after specifying a destination user. The transmitted message M is received by the message reception section 22 of the server device 2 and transmitted to the client device 3 used by the destination user by the message transmission section 23. It should be noted that the transmission of the message M to the destination user by the message transmission section 23 may be implemented by push type data distribution or pull type data distribution. In either case, so long as the destination user is a registered user, this user should have the client program installed in his or her client device 3. The destination user starts the client program and views the message M transmitted from the transmitting user within the client program. The message M in the present service is described in a unique data format. Use of the dedicated client program by both the transmitting and destination users allows the message M to be generated and viewed. This makes it possible for each user to exchange, with other users, the message M that includes not only text but also a variety of information such as pictographs, still images, movies, voice messages, and device position information.

Further, in the present embodiment, a registered user can transmit the message M even to a user who has not yet registered for the service by the service registration acceptance section 21 and therefore whose user information does not exist in the user database. A user who has not yet registered for the service by the service registration acceptance section 21 will be hereinafter referred to as an unregistered user. Further, the message M having an unregistered user as a destination user will be particularly denoted as a prior message PM. If an unregistered user is a destination user, the client device 3 used by the transmitting user transmits the prior message PM to the server device 2 together with identification information used to identify the destination user. If the message reception section 22 of the server device 2 receives the prior message PM together with identification information of a destination user (unregistered user), the message reception section 22 associates the prior message PM with the identification information and temporarily records these pieces of information in the storage section 12. The reason for this is that the prior message PM cannot be immediately transmitted to the destination user.

A description will be given here of a specific example of identification information accepted by the message reception section 22 together with the prior message PM. Identification information is used to uniquely identify an unregistered user, the destination of the prior message PM, to prevent confusion with other individuals. More specifically, identification information may include contact information used by the transmitting user to contact the unregistered user in one way or another. An example of such a contact is a mobile phone number, email address, social networking service account, and so on. If the transmitting user is an acquaintance of the destination user, it is probable that the transmitting user knows at least one of these contacts of the destination user. Further, it is normally unlikely that these contacts may accidentally match those of other users. Therefore, one of or a combination of a plurality thereof may be used as identification information of the unregistered user. Further, identification information may include not only contacts but also personal information of the unregistered user such as name and birthday.

The transmitting user may manually enter the above identification information into the client program when transmitting the prior message PM. Alternatively, the client program may acquire identification information that is registered in advance in the client device 3 itself and transmits this information to the server device 2. In particular, if the client device 3 is, for example, a mobile phone or smartphone, it is probable that there is a contact database such as phonebook that is referred to when the user uses the telephone call function of the client device 3. In the description given below, a contact database referred to when the client device 3 uses the telephone call function will be simply referred to as phonebook data. Phonebook data of the client device 3 stores personal information such as contacts and names of the acquaintances of the user of the client device 3. The client program of the client device 3 can acquire identification information of the unregistered user by accessing this phonebook data.

In particular, if identification information includes a contact of the unregistered user, the message reception section 22 may notify the contact that the prior message PM has been received. Even if the destination user is an unregistered user, so long as a contact such as phone number or mail address is known, it is possible to transmit a message of some kind to that contact in a way different from that for the message M. In the description given below, a notice transmitted to the unregistered user by the message reception section 22 in a way different from that for the present service will be referred to as a reception notice RN. More specifically, if, for example, identification information includes a mobile phone number, the message reception section 22 can transmit the reception notice RN as a text message addressed to the phone number using a short message service (SMS). On the other hand, if identification information includes a mail address, the message reception section 22 can transmit the reception notice RN using the email. Alternatively, if identification information includes a social networking service account, the message reception section 22 can transmit the reception notice RN using the message function of the social networking service.

The reception notice RN is not described in a data format unique to the present service. Therefore, it is not possible to transmit the content of the prior message PM in a manner intended by the transmitting user. However, the reception notice RN may include part or whole of the character string information included in the prior message PM. This makes it possible for the unregistered user to grasp part of the content of the prior message PM without installing the client program. Further, the reception notice RN may include a message prompting the installation of the client program or link information (e.g., URL) of the download source of the client program. This makes it possible to prompt an unregistered user who has received the reception notice RN to register for the present service and view the content of the prior message PM.

The message transmission section 23 determines whether or not the prior message PM addressed to a new user is recorded if the service registration acceptance section 21 registers the new user to the service after the reception of the prior message PM by the message reception section 22. In the description given below, a user who registers anew to the present service after the reception of the prior message PM will be particularly referred to as a new registered user. More specifically, the message transmission section 23 performs matching on the basis of identification information of the destination user accepted together with the prior message PM and profile information of the new registered user. This matching is a process for determining whether or not the new registered user is the destination user of the prior message PM. Then, if it is determined as a result of matching that the two are the same user, the message transmission section 23 transmits the prior message PM to the client device 3 used by the new registered user.

It should be noted that the message transmission section 23 performs matching on only the prior messages PM addressed to users who have not yet registered for the service, among all the prior messages PM received by the message reception section 22 in the past. If it is determined as a result of matching that the destination user matches the new registered user, the destination user of the prior message PM turns into a registered user. Therefore, even if a different new registered user registers to the service afterwards, it is no longer necessary to perform matching on that prior message PM. Therefore, the server device 2 manages, as a registration flag, whether or not the destination user for each of the prior messages PM received in the past registered for the service. The message transmission section 23 changes the registration flag of the prior message PM from "Unregistered" to "Registered" if the message transmission section 23 determines as a result of matching that the new registered user is the destination user of that prior message PM. Then, when matching is performed for another new registered user, only the prior messages PM whose registration flag remains as "Unregistered" are subjected to matching.

A description will be given here of a specific example of matching performed by the message transmission section 23. The message transmission section 23 basically compares identification information of the destination user accepted by the message reception section 22 together with the prior message PM against profile information provided by the new registered user. The message transmission section 23 determines that the destination user of the prior message PM and the new registered user are the same user when the two pieces of information match within the bounds of given conditions. More specifically, for example, the message transmission section 23 determines that the two users are the same user when there is a perfect match between the phone number of the mobile terminal acquired as identification information of the destination user and the phone number registered by the new registered user. Further, the message transmission section 23 may determine that the two users are the same user if there is a match in terms of a predetermined type of information such as mail address in place of or in addition to phone number. A description will be given later of a further detailed specific example of matching between the destination user of the prior message PM and the new registered user.

If matching is performed, the new registered user has completed his or her registration to the service by then. Therefore, the message transmission section 23 can transmit the prior message PM, described in a data format unique to the present service, to the new registered user by the same process as for transmitting the message M to a registered user. This allows the new registered user to display and view the prior message PM, transmitted to himself or herself before the registration to the present service, in a manner intended by the transmitting user.

In particular, the message transmission section 23 may perform matching on each of the plurality of prior messages PM received by the message reception section 22 by then when the service registration acceptance section 21 accepts the registration of the new registered user to the service. In this case, the message transmission section 23 may immediately transmit, to the client device 3 of the new registered user, the plurality of prior messages PM that have been extracted because there is a match between the destination user and the new registered user as a result of matching. This allows the new registered user to view the prior messages PM addressed to himself or herself immediately after the completion of his or her registration. Alternatively, the message transmission section 23 may present, to the new registered user, a list of the prior messages PM whose destination users match the new registered user among all the prior messages PM that were received and recorded in the past and may individually transmit the prior messages PM, selected by the new registered user, to the client device 3 of the new registered user.

It should be noted that when the message transmission section 23 transmits the prior messages PM to the client device 3 of the new registered user, the message transmission section 23 transmits, to the client device 3, information about the dates and times of transmission of the prior messages PM from the transmitting user to the server device 2 together with the prior messages PM. If the content of the prior message PM is displayed after the registration of the new registered user, the client program of the client device 3 displays, as a date and time of transmission of that prior message PM, the date and time of transmission of the prior message PM from the original transmitting user to the server device 2 rather than that from the server device 2 to the client device 3 of the new registered user.

Figure 3:
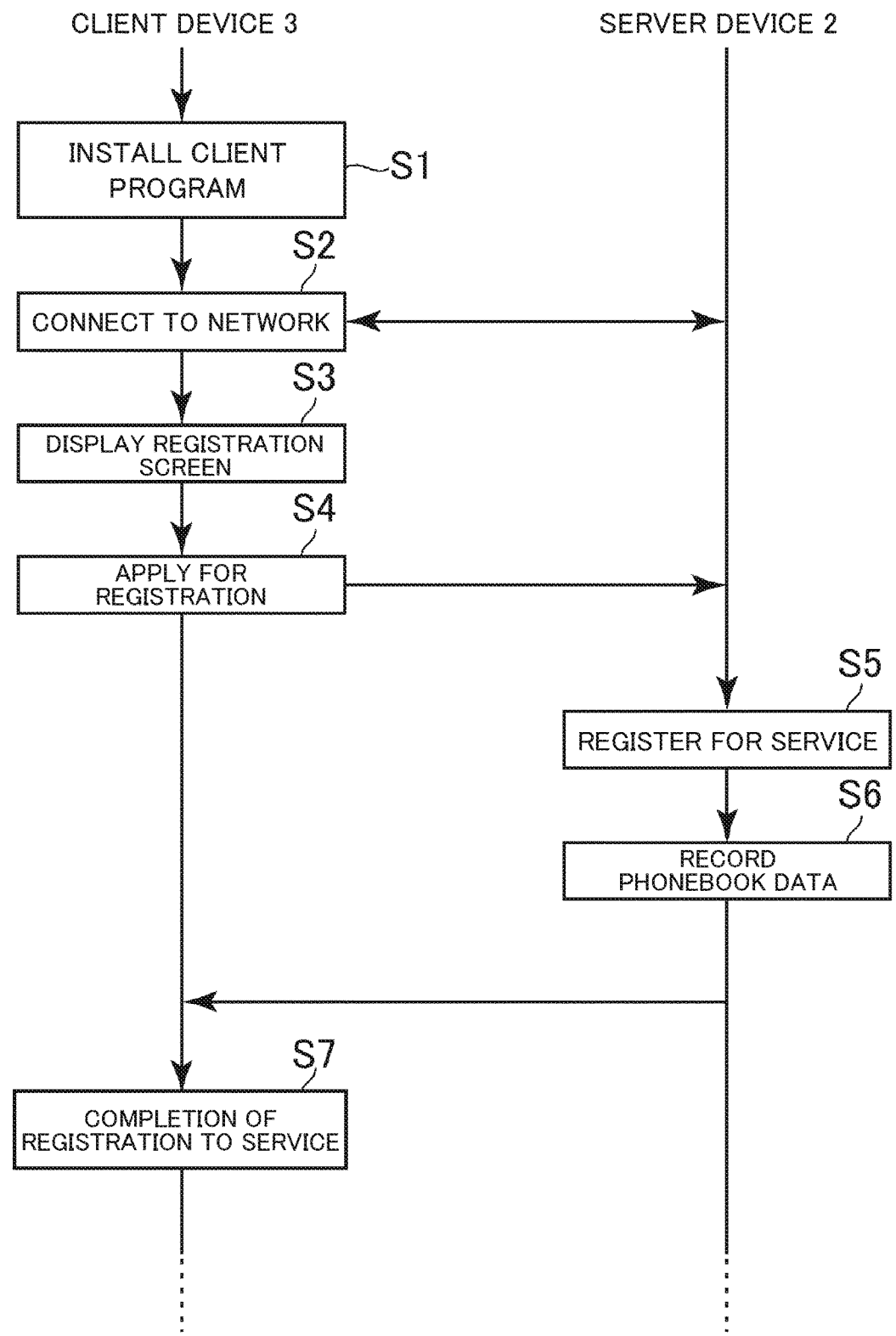
FIG. 3 is a flowchart illustrating an example of processing flow when a user wishing to register for the service does so.

A description will be given below of a specific example of processing flow handled by the message exchange system 1 according to the present embodiment. A description will be given first of an example of processing flow when a user wishing to register for the service does so with reference to the flowchart in FIG. 3.

First, the user wishing to register for the service installs the client program into his or her client device 3 (S1). When the installation is complete, the client program establishes network connection with the server device 2 (S2). Then, the client program displays an activate screen (registration screen), prompting the user wishing to register for the service to enter profile information (S3). Profile information entered here includes the name of the user wishing to register for the service, his or her phone number, and so on. It should be noted that the client program may acquire at least part of profile information by referring, for example, to owner's information recorded in the client device 3 rather than causing the user wishing to register for the service to manually enter such profile information.

When the entry is complete, the client program transmits, to the server device 2, an application for registration that includes the entered profile information in response to an instruction from the user wishing to register for the service (S4). At this time, the client program transmits the phonebook data, recorded in the client device 3, together with the application. The service registration acceptance section 21 of the server device 2 stores the profile information of the user wishing to register for the service transmitted in S4 to the user database, thus registering the user to the service (S5). Further, the service registration acceptance section 21 records the phonebook data of the user wishing to register for the service transmitted in S4 to the storage section 12 (S6). Then, the registration to the service is complete when the client device 3 receives, from the server device 2, a notice to the effect that the recording is complete (S7). As a result, the user wishing to register for the service turns into a registered user, thus allowing this user to transmit messages M with other users.

Figure 4:
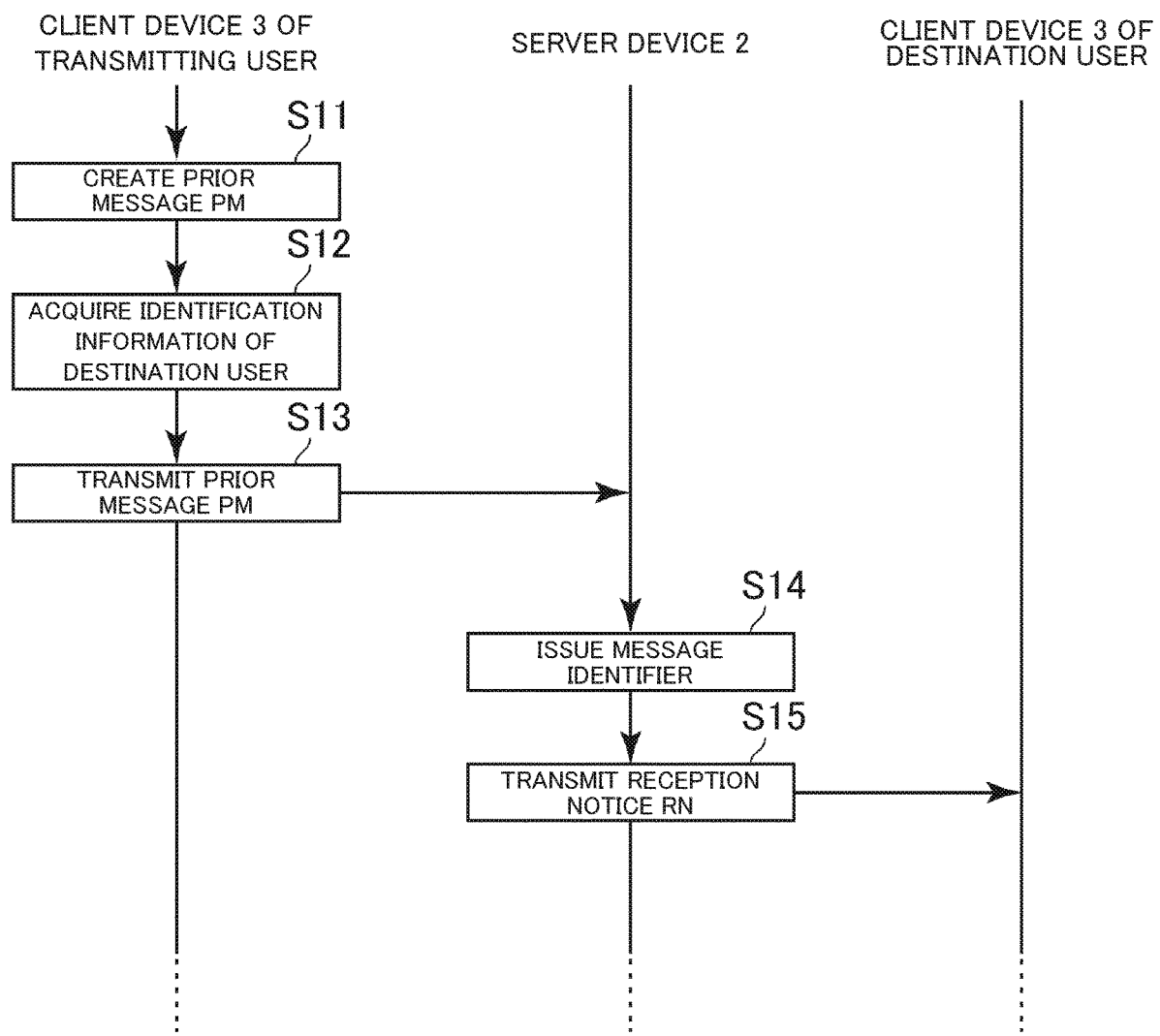
FIG. 4 is a flowchart illustrating an example of processing flow when a registered user transmits a prior message PM to an unregistered user.

A description will be given next of an example of processing flow when a registered user transmits, as a transmitting user, the prior message PM to an unregistered user with reference to the flowchart in FIG. 4.

First, the transmitting user creates the prior message PM on his or her client device 3 using the client program and selects an unregistered user as a destination (S11). At this time, we assume that the client program refers to the phonebook data in the client device 3 and presents a list of candidates for destinations to the transmitting user, thus causing him or her to choose the destination of the prior message PM. It is possible to present a list of candidates for destinations including unregistered users to the transmitting user by referring to the phonebook data. If the transmitting user selects an unregistered user as a destination, the client program refers to the phonebook data about the unregistered user specified as a destination, thus acquiring identification information including contacts of the unregistered user (S12). Then, the client program transmits the prior message PM, created in S11, to the server device 2 together with the identification information acquired in S12 (S13).

When the message reception section 22 of the server device 2 receives the prior message PM transmitted in S13, the message reception section 22 issues an identification code (message identifier) of the prior message PM (S14). This message identifier is recorded to the management database of the prior messages PM in association with the prior message PM and identification information received together with the prior message PM. It should be noted that the message reception section 22 may refer to not only identification information received together with the prior message PM but also phonebook data that was received from the user wishing to register for the service in S4 and recorded in S6, thus acquiring information about the unregistered user. This makes it possible for the message reception section 22 to acquire other personal information (e.g., name, mail address, and birthday) of the destination user of the prior message PM and use this information as identification information for identifying the destination user of the prior message PM by referring to the phonebook data of the transmitting user that has already been acquired even if, for example, identification information transmitted from the client program together with the prior message PM is only a phone number.

Further, the message reception section 22 transmits the reception notice RN to the contact included in the identification information (S15). Here, as a specific example, we assume that the contact is a phone number, and that the message reception section 22 transmits the reception notice RN to the phone number using a short message service. Further, we assume that the reception notice RN includes link information indicating the download source of the client program and the message identifier issued in S14. Still further, we assume that the message identifier is included in link information, for example, in the form of an argument.

A description will be given next of an example of processing flow when an unregistered user who has received the reception notice RN transmitted in S15 registers to the present service using the reception notice RN with reference to the flowchart in FIG. 5.

The unregistered user who has received the reception notice RN transmitted in S15 with his or her client device 3 selects the link to the download source included in the reception notice RN. As a result, a request to download the client program is transmitted to the server device 2 (S21). This link includes the message identifier issued for the prior message PM as described earlier. Therefore, the server device 2 can identify which destination user of the prior message PM made the download request by referring to the message identifier included in the download request.

The service registration acceptance section 21 of the server device 2 which has accepted the download request transmitted in S21 issues a file identifier first to identify the file to be downloaded for the client program (S22). This file identifier is stored in the server device 2 in association with the message identifier included in the download request accepted in S21. Next, the service registration acceptance section 21 transmits the file to be downloaded for the client program including the file identifier issued in S22 to the client device 3 which made the request (S23).

The client device 3 which has received the file transmitted in S23 installs the client program using this downloaded file (S24). It should be noted that the downloaded file from the server device 2 to the client device 3 here may include the client program itself. Alternatively, the downloaded file may include information about a different download source of the client program. In this case, the client device 3 downloads the client program itself from another server by referring to information included in the downloaded file, thus installing the client program.

When the installation of the client program is complete, the client program of the client device 3 transmits, to the server device 2, the file identifier included in the downloaded file transmitted in S23 (S25). The service registration acceptance section 21 identifies the message identifier associated with the file identifier received in S25 and determines whether the validity period of the message identifier has expired (S26). Here, the term "validity period of the message identifier" refers to a period in which automatic entry (described later) is permitted during registration to the service using the identification information received together with the prior message PM. The validity period of a message identifier may be a predetermined period of time set starting from the time when the message identifier is issued in S14.

If it is determined in S26 that the validity period has not yet expired, the service registration acceptance section 21 performs automatic entry of identification information when the unregistered user registers to the service, thus acquiring identification information to be automatically entered (S27). This identification information was received by the message reception section 22 together with the prior message PM associated with the message identifier identified in S26. This identification information was specified by the transmitting user of the prior message PM. Further, the service registration acceptance section 21 may permit automatic entry of not only identification information received by the message reception section 22 together with the prior message PM but also personal information of the unregistered user acquired from the phonebook data using this identification information as a key. Personal information in this case is information of the unregistered user registered in the phonebook data of the transmitting user of the prior message PM and recorded in the server device 2 in the process of S6 described above.

Then, the service registration acceptance section 21 transmits, to the client device 3, an instruction to display a registration screen (S28). At this time, if the service registration acceptance section 21 acquires identification information and other personal information of the unregistered user in S27, the service registration acceptance section 21 transmits the acquired personal information all together to the client device 3. On the other hand, if it is determined in S26 that the validity period has expired, the service registration acceptance section 21 transmits an instruction to display a registration screen without including any personal information.

The client program of the client device 3 displays a registration screen in response to the instruction transmitted in S28 (S29). At this time, if personal information of the unregistered user has been transmitted from the server device 2, the client program shows the transmitted identification information and other personal information as initial values at the time of entry on the screen. As a result, personal information of the unregistered user known to the transmitting user of the prior message PM is automatically entered in advance on the registration screen. This allows the unregistered user to skip at least part of the entry of his or her own profile information at the time of registration to the service, thus saving time and effort. Following the entry of necessary information on the registration screen, the client program transmits a registration application including the entered profile information to the server device 2 in response to an instruction from the unregistered user (S30). The processes following after S30 are the same as the processes following after S4 in FIG. 3.

It should be noted that, in the above description, a file identifier is included in the downloaded file to identify the correspondence between the message identifier of the prior message PM and the unregistered user attempting to register anew. However, the service registration acceptance section 21 is not limited thereto and may identify the correspondence between the destination user of the prior message PM and the unregistered user in other way. For example, when the service registration acceptance section 21 accepts, from an unregistered user who has received the reception notice RN of the prior message PM, a request to download the client program, the service registration acceptance section 21 acquires terminal identification information that permits identification of the client device 3 that made the request and records the terminal identification information in association with the message identifier included in the reception notice RN. Then, when the service registration acceptance section 21 accepts a new registration application from the client device 3 which has installed the client program, the service registration acceptance section 21 checks the terminal identification information of the client device 3 which has made a registration application against the terminal identification information acquired from the unregistered user in the past, thus linking the destination user of the prior message PM to the user wishing to register for the service.

A description will be given next of several specific examples of matching between a destination user of the prior message PM and a new registered user handled by the message transmission section 23.

A description will be given first of an example of matching using a phone number and a message identifier as a first example of matching. In the present service, each of the users who have registered for the service is identified using a mobile terminal phone number. However, a phone number may be used by a plurality of users due, for example, to cancellation of the phone subscription. In the description given below, we suppose the following case as a hypothetical example for explaining the details of the matching. That is, a user X used a phone number N1 at first. Later, however, the user X cancelled the phone subscription for the phone number N1. Then, after some time, a new user Y made a phone subscription, and the same phone number N1 was assigned to the user Y.

FIG. 6 is a diagram describing the chronological order of events in this example. In this example, first, a user A, an acquaintance of the user X, transmitted, to the server device 2, a prior message PM1 that included the phone number N1 as identification information on Dec. 1, 2012. Afterwards, the user X cancelled the phone subscription for the phone number N1 on Dec. 31, 2012 without registering to the present service. On Jan. 1, 2014, about one year from the cancellation, the new user Y began to user the phone number N1. Further afterwards, a user B, an acquaintance of the user Y transmitted, to the server device 2, a prior message PM2 that included the same phone number N1 as identification information on Mar. 10, 2014. Here, there is a match in identification information between the prior messages PM1 and PM2. However, these prior messages PM are different in terms of the destination user intended by the transmitting user. Still further afterwards, a user C, another acquaintance of the user Y, transmitted, to the server device 2, a prior message PM3 that again included the same phone number N1 as identification information on May 1, 2014. The user Y who had received the reception notice RN of the prior message PM3 registered for the present service in an hour after the transmission of the prior message PM3.

In the above example, when the user Y registers to the service, the phone number N1 is entered as profile information. For each of the three prior messages PM, the destination user thereof is identified by the phone number N1. Therefore, matching using the above phone number should allow the message transmission section 23 to determine that the destination user of all the prior messages PM is the user Y. In the example described above, however, the prior message PM1 was addressed to the user X, and not to the user Y. Therefore, the prior message PM1 should not be transmitted to the client device 3 used by the user Y. For this reason, in this first example of matching, we assume that the message transmission section 23 requests the new registered user to enter the message identifier assigned to each prior message PM as a condition for transmitting each prior message PM to the new registered user. As described earlier, a message identifier is information issued to identify each of the prior messages PM when the message reception section 22 receives the prior message PM. Here, we assume that a message identifier includes a character or numeric string. In this example of matching, each time the message reception section 22 receives the prior message PM, the message reception section 22 issues a message identifier for the prior message PM and transmits, to the destination user, the reception notice RN that includes the message identifier.

This configuration means that the message identifier of the prior message PM is known only to a user who has a mobile terminal with a phone number identified by identification information when the transmitting user transmits the prior message PM. In the example of FIG. 6, when the prior message PM1 is transmitted, the user Y does not have the client device 3 to which the phone number N1 has been assigned. Therefore, the user Y does not receive the reception notice RN of the prior message PM1, which makes it impossible for the user Y to know the message identifier. On the other hand, when each of the prior messages PM2 and PM3 is transmitted, the user Y has the client device 3 to which the phone number N1 has been assigned. Therefore, the user Y receives the reception notices RN of these prior messages PM. The new registered user who has registered for the present service enters, on the client program, the message identifier included in each of the reception notices RN which he or she received. When the new registered user enters the message identifier, the message transmission section 23 determines that the destination user of the prior message PM to which the entered message identifier is assigned matches the new registered user and transmits the prior message PM to the new registered user. As for the prior message PM for which no message identifier has been entered, on the other hand, the message transmission section 23 does not disclose the prior message PM to the new registered user. Thereby, the prior message PM is not transmitted to unintended users. More specifically, in the example of FIG. 6, the user Y can view the prior messages PM2 and PM3 by entering their message identifiers. However, the user Y cannot view the prior message PM1.

It should be noted that, in the above description, the new registered user manually enters a message identifier. In order to save time and effort, however, link information of a given protocol including a message identifier may be included in the reception notice RN. In this case, we assume that the protocol is associated with the client program. This ensures that selecting link information included in the reception notice RN after installation of the client program allows the new registered user to readily enter the message identifier included in the link information into the client program.

Further, in the description given above, the new registered user needs to enter all the message identifiers respectively included in the reception notices RN received. However, it takes time and effort for the new registered user to enter all the message identifiers. Therefore, the new registered user may be allowed to receive, from the message transmission section 23, the prior message PM without entering the message identifier thereof, so long as a given condition is met. For example, the message transmission section 23 may transmit, to the new registered user, the prior message PM unconditionally without requesting the entry of a message identifier if the prior message PM is received by the message reception section 22 within the given time period (e.g., 24 hours) until the new registered user registered for the service. Normally, a certain interval is provided from the cancellation of the phone subscription for the mobile terminal by a user to the allocation of the same phone number to another user. Therefore, a validity period is provided for the prior message PM in consideration of the interval. If a new registered user registers to the service before the validity period expires, the message transmission section 23 unconditionally transmits the prior message PM. This allows the new registered user to view, at the time of registration to the service, the prior messages PM that have been received comparatively recently without bothering to enter the message identifiers.

Further, if the new registered user enters the message identifier for one of the plurality of prior messages PM extracted by matching, the message transmission section 23 may transmit, to the new registered user, the prior messages PM received by the message reception section 22 later than the above prior message PM without requesting the entry of a message identifier. More specifically, in the example of FIG. 6, if the user Y enters the message identifier of the prior message PM2 following the registration to the service, the prior message PM3 received later than the prior message PM2 is transmitted to the user Y without requesting the entry of the message identifier. The reason for this is that if the message identifier is entered for the particular prior message PM, it is possible to verify that the new registered user who registers to the service continues to use the same phone number from the reception of the particular prior message PM by the server device 2 to the registration of the new registered user to the service. In this configuration, by selecting the reception notice RN received in the past, selecting the older reception notice RN being preferable, and entering the message identifier included therein, the new registered user can view all the prior messages PM that were received later than the prior message PM corresponding to the selected reception notice RN without entering other message identifiers.

A description will be given next of a second example of the matching. In the second example, a plurality of prior messages PM which include different phone numbers as identification information are transmitted to a single unregistered user. In the description given below, we suppose the following case as a hypothetical example for explaining the details of the matching. That is, the user X, an unregistered user, was using the phone number N1 at first. Later, the user X cancelled the phone subscription for the phone number N1 and made a phone subscription for a phone number N2 anew. Further, we assume here that the users A and B are acquaintances of the user X, that, in the phonebook data of the user A, a mail address A1 and the old phone number N1 are registered as contacts of the user X, and that, in the phonebook data of the user B, the mail address A1 and the new phone number N2 are registered as contacts of the user X.

In this example, we assume that the user A transmitted the prior message PM1 to the user X after the user X had finished changing the phone number to N2. At this time, the client device 3 of the user A transmits the phone number N1 and the mail address A1 to the server device 2 as identification information together with the prior message PM1. Here, in the phone number and the mail address, we assume that the phone number is main identification information used as a destination of the reception notice RN, and that the mail address is auxiliary identification information used for matching in an auxiliary manner. The message reception section 22 transmits the reception notice RN to the phone number N1, main identification information. However, the user X already no longer uses the phone number N1. Therefore, the user X cannot receive the reception notice RN. We assume that the user B also transmits the prior message PM2 to the user X afterwards. In this case, the client device 3 of the user B transmits, to the server device 2, the phone number N2 and the mail address A1 as identification information together with the prior message PM2. The message reception section 22 transmits the reception notice RN for the prior message PM2 to the phone number N2. Therefore, the user X can receive the reception notice RN.

We assume that the user X who had received the reception notice RN for the prior message PM2 performs the registration of the present service afterwards. At this time, the user X registers the phone number N2 and the mail address A1 as his or her own profile information. The message transmission section 23 performs matching in response to the registration to the service. In this example, identification information of the prior message PM2 matches the phone number N2 and the mail address A1 registered by the user X. Therefore, it is determined that the destination user of the prior message PM2 agrees with the user X. Therefore, the message transmission section 23 changes the registration flag of the prior message PM2 to "Registered," transmitting the prior message PM2 to the user X. This allows the user X to view the prior message PM2 that was transmitted from the user B in the past. FIG. 7A is an example of identification information of the prior message PM managed by the server device 2 at this point in time. In FIG. 7A, the phone number N1 and the mail address A1 are associated with the prior message PM1 as identification information, with the registration flag set to "Unregistered." On the other hand, the phone number N2 and the mail address A1 are associated with the prior message PM2 as identification information, with the registration flag updated to "Registered."

In this example, the phone number N1, main identification information of the prior message PM1, does not agree with the profile information registered by the user X. Therefore, the user X cannot view the prior message PM1 with the phone number N1 left unchanged. However, the mail address A1, auxiliary identification information, agrees with the mail address A1 entered by the user X as profile information. For this reason, the message transmission section 23 extracts, from among the prior messages PM received in the past, those having common associated auxiliary identification information, thus determining whether or not there is a match in the registration flag. Then, if the plurality of prior messages PM are extracted which have common auxiliary identification information and whose registration flags disagree (i.e., the registration statuses are different), the message transmission section 23 determines the prior messages PM whose registration flags are "Unregistered" are to be transmitted, thus updating the main identification information thereof. More specifically, in FIG. 7A, the registration flag of the prior message PM2 has been updated to "Registered." This means that a match has already been confirmed between the auxiliary identification information of the prior message PM2 and the profile information of the user X. Therefore, it is possible to presume that the prior message PM1 which has auxiliary identification information common to that of the prior message PM2 is addressed to the same user X. For this reason, the message transmission section 23 updates the main identification information of the prior message PM1 to the phone number N2 and changes the registration flag thereof to "Registered." FIG. 7B illustrates that the identification information of the prior message PM shown in FIG. 7A has been updated by the above second example of matching. In the above processing example, the user A who does not know the current phone number N2 of the user X can transmit the prior message PM1 to the user X.

It should be noted that auxiliary identification information here is a mail address. However, auxiliary identification information is not limited thereto, and a name or other personal information or a combination thereof may be used as auxiliary identification information. In particular, if a combination of a plurality of pieces of personal information is used as auxiliary identification information, or if user-specific information that is unlikely to be shared by a plurality of users (e.g., social networking service account) is used as auxiliary identification information, it is possible to prevent transmission of the prior message PM to a wrong user.

A description will be given next of another case in which identification information includes a plurality of contacts as a third example of matching. We assume here that, unlike the second example of matching, a plurality of pieces of identification information associated with the prior message PM are each managed as an independent record. For example, it is common that a user uses a plurality of phone numbers or a plurality of mail addresses at the same time. In such a case, the phonebook data of an acquaintance of the user includes a plurality of pieces of information of the same kind as contacts of the user. In the present processing example, the plurality of these contacts are each recorded as an independent piece of identification information.

We suppose, as a specific example, a case in which the user A transmits the prior message PM1 to the user X, an unregistered user. We assume here that, in the phonebook data of the user A, four pieces of information, namely, the phone numbers N1 and N2 and the mail addresses A1 and A2, are registered as contacts of the user X, and that when the user A transmits the prior message PM1, these four contacts are transmitted as identification information together with the prior message PM1. FIG. 8 is an example of identification information of the prior message PM1 recorded to the server device 2 by the message reception section 22 in this case. In FIG. 8, four records are recorded for the four contacts. Further, we assume that, in this example, the message reception section 22 transmits the reception notice RN to the phone number N1, the first phone number, of all the pieces of identification information.

In this example, the user X receives the reception notice RN at the phone number N1. However, he or she will not necessarily register for the present service using this reception notice RN. Further, even if the user X registers to the service using this reception notice RN, he or she may wish to register for the service by specifying a contact other than the phone number N1 (e.g., phone number N2) as profile information. In either case, if the user X specifies any one of the above four contacts as profile information, one of the four records shown in FIG. 8 achieves successful matching. Unlike in the second example of matching, each of the plurality of contacts is recorded as an independent piece of identification information in this matching example. Therefore, if a match is found between profile information and one of the pieces of identification information, the new registered user can view the associated prior message PM.

It should be noted that, in this matching example, a plurality of records are recorded for the single prior message PM. If the registration flag is changed to "Registered" after finding a match with one of these records, it is no longer necessary to perform matching on other records. For this reason, if matching is successful for a new registered user with one of the pieces of identification information, the message transmission section 23 may change, to "Registered," not only the registration flag associated with the identification information but also those of all the records registered for the same prior message PM. Alternatively, because there is no practical benefit for a new registered user to continue to hold records other than contacts registered as profile information, other records may be simply deleted. As a specific example, if the user X registers to the service by specifying the phone number N2 as profile information with four records retained as shown in FIG. 8, the message transmission section 23 may leave only the record including the phone number N2 and delete the three other records.

A description will be given next of an example of an anti-spam measure available in the present service. In a message exchange service such as the present service, nuisance actions may occur, such as transmitting advertisement messages and the like (so-called spam messages) to an unspecified number of users without obtaining their consent, and measures against such nuisance actions are demanded. However, there are cases in which messages are sent rightfully to a number of users with obtaining their consent. It is difficult to technically distinguish between the two. If a transmitting user transmits the prior message PM to a plurality of unregistered users in particular, the server device 2 according to the present embodiment may determine, in a way as described below, whether or not the transmission is a nuisance action.

That is, if a transmitting user transmits the prior message PM to a plurality of unregistered users, the server device 2 counts how many unregistered users register for the present service during a set period of time thereafter. When the transmission of the prior message PM is conducted with consent from the destination users, or when the transmitting user is an acquaintance of the destination users, there is a certain likelihood that the destination users will register for the present service. On the other hand, if the transmission from a transmitting user is conducted without consent from the destination users, and if the transmitting user is not an acquaintance of the destination users, there is a small likelihood that the destination users will register for the present service. For this reason, the server device 2 calculates the ratio of the number of destination users who register for the service during a set period of time thereafter to the number of destination users to which a transmitting user has transmitted the prior message PM, thus determining whether or not the ratio is smaller than a given threshold. If the calculated ratio is smaller than the threshold, it can be presumed that the transmitting user transmits spam messages. Thus, the present service can identify spam senders in a way specific to the present service.

The server device 2 according to the embodiment of the present invention described above allows a user who has registered for the present service to transmit a prior message in a data format unique to the present service even to a user who has not yet registered for the present service. Then, the user who is the destination of the prior message registers to the present service after the transmission of the prior message, thus allowing him or her to view the prior message addressed to him or her in the data format unique to the present service in an ex post facto manner.

It should be noted that the embodiment of the present invention is not limited to that described above. In the description given above, for example, phone numbers are mainly used as identification information, and the message reception section 22 transmits the reception notice RN using a short message service. However, the embodiment of the present invention is not limited thereto, and the message reception section 22 may transmit the reception notice RN using a voice message addressed to the phone number. Alternatively, the message reception section 22 may transmit the reception notice RN using an email addressed to the mail address included in identification information. Still alternatively, the reception notice RN may be transmitted by one of a variety of other communication means, and a plurality of communication means may be used in combination.

Further, an unregistered user does not necessarily receive the reception notice RN in order to view the prior message PM. Instead, the server device 2 may permit the user to view the prior message PM if the user succeeds in matching based on profile and identification information following the registration to the service. However, it should preferably be verified that profile information of a new registered user used for matching in this case is correctly that of the new registered user. This is intended to prevent a malicious user from impersonating other person and viewing the prior message PM of that person. As a specific example, if a phone number is used as identification information, the client program may read the phone number of the client device 3 (mobile terminal) recorded in the client device 3 and transmit the phone number to the server device 2 as part of profile information. Alternatively, if an account of an external service such as social networking service is used as identification information, the server device 2 may verify, in cooperation with the external service, whether or not the account accepted as profile information has been authenticated by the external service. Alternatively, if information of an account authenticated by the external service is recorded in the client device 3, the client program may transmit that account information to the server device 2 as part of profile information.

Further, a keyword agreed on between the sender and receiver of the prior message PM may be used to determine whether or not a new registered user is permitted to view the prior message PM. In this case, the transmitting user specifies a keyword for opening the prior message PM at the time of creating the prior message PM. The server device 2 records this keyword in association with the prior message PM and permits a new registered user to view the prior message PM when the server device 2 accepts the entry of the keyword from the new registered user.

Further, in the above description, a user wishing to register for the service enters all profile information required for matching at the time of registration. However, the embodiment of the present invention is not limited thereto, and a user wishing to register for the service may add or change profile information in an ex post facto manner after the completion of registration to the service. In this case, the message transmission section 23 may perform matching again in response to a change made to profile information.

Further, in the above description, the message transmission section 23 performs matching on all the prior messages PM whose registration flags are "Unregistered" after the completion of registration to the service. However, the embodiment of the present invention is not limited thereto, and the message transmission section 23 may perform, as a preliminary process for transmitting the prior message PM, matching between identification information of the new received prior message PM and that of the prior messages received in the past each time the message reception section 22 receives the prior message PM. Such a configuration allows the message transmission section 23 to group, in advance, the plurality of prior messages PM that are considered to have the same destination user. This ensures that all the prior messages PM addressed to unregistered users are grouped by unregistered user for management. For this reason, when a new user registers to the service, the message transmission section 23 need only perform matching between the new registered user and unregistered users in this group unit.

REFERENCE SIGNS LIST

1 Message exchange system, 2 Server device, 3 Client device, 11 Control section, 12 Storage section, 13 Communication section, 21 Service registration acceptance section, 22 Message reception section, 23 Message transmission section.

The invention claimed is:
1. A server device comprising:
at least one memory operable to store program code;
at least one processor operable to read said program code and operate as instructed by said program code, said program code including:
message reception code configured to cause at least one of said at least one processor to:
receive a first message at a first time from a source user,
receive a second message,
receive, from a second user, profile information;
associate the first message with identification information used to identify a destination user, wherein the destination user is an unregistered user who has not yet registered for a message exchange service at the first time, wherein the identification information includes main and auxiliary identification information, and
record the message and the identification information for later exchange;
service registration code configured to cause at least one of said at least one processor to proceed, responsive to a request from the second user at a second time, with a registration of the second user wishing to use the message exchange service, and to receive second identification information identifying the second user from the second user at a time of the registration corresponding to the second time;
matching code configured to, responsive to the registration of the second user, cause at least one of said at least one processor to perform a successful match of the second identification information received from the second user at the time of the registration with the identification information used to identify the destination user, by determining:
  i) that the auxiliary identification information of the first message matches the profile information,
  ii) that the auxiliary identification information of the first message matches the auxiliary identification information of the second message, and
  iii) that the second user is an intended recipient of the second message; and message transmission code configured to cause at least one of said at least one processor to, responsive to the registration of the second user and the successful match of the second user and only if the registration has been performed, transmit the first message and the second message to the second user at a third time.

2. The server device according to claim 1,
wherein:
the identification information includes a contact of the destination user, and
the message reception code causes at least one of said at least one processor to transmit, to the contact before the third time, a notice that the message has been received.

3. The server device according to claim 2,
wherein the message reception code causes at least one of said at least one processor to:
include, in the notice that the message has been received, a message identifier adapted to identify the first message,
receive an acceptance of the message identifier from the second user, and
confirm that the second user is the destination user of the first message.

4. The server device according to claim 3,
wherein the service registration code is further configured to cause at least one of said at least one processor to transmit, to a client device of the second user, the second identification information as an initial value when the second user has provided profile information.

5. The server device according to claim 2, wherein the notice includes information indicating a download source of a client program to be used for the message exchange service.

6. The server device according to claim 1,
wherein the message reception code is further configured to cause at least one of said at least one processor to receive third identification information including a plurality of contacts of the destination user together with the first message, and
the message transmission code is further configured to cause at least one of said at least one processor to determine that the second user corresponds to the destination user if at least one of the plurality of contacts matches profile information provided by the second user.

7. The server device according to claim 1, further comprising:
ratio calculating code configured to cause at least one of said at least one processor to calculate a ratio of a number of destination users who register for the message exchange service to a number of destination users if a plurality of messages are transmitted from a transmitting user to a plurality of unregistered users as destination users.

8. A server device control method comprising:
receiving a first message at a first time from a source user;
receiving a second message;
receiving, from a second user, profile information;
associating the first message with identification information used to identify a destination user, wherein the destination user is an unregistered user who has not yet registered for a message exchange service at the first time, wherein the identification information includes main and auxiliary identification information;
recording the first message and the identification information for later exchange;
accepting profile information, at a time of a registration and responsive to a request from the second user, the second user wishing to use the message exchange service and proceeding with the registration of the second user to the message exchange service at a second time, wherein the profile information includes second identification information identifying the second user, and the time of the registration corresponds to the second time;
successfully matching, responsive to the registration of the second user, the second identification information received from the second user at the time of the registration with the identification information used to identify the destination user, wherein the successfully matching comprises determining:
i) that the auxiliary identification information of the first message matches the profile information,
ii) that the auxiliary identification information of the first message matches the auxiliary identification information of the second message, and
iii) that the second user is an intended recipient of the second message; and
transmitting, responsive to the registration of the second user and the successfully matching and only if the registration has been performed, the first message and the second message to the second user, wherein the message is a recorded message.

9. A non-transitory computer-readable information storage medium that stores a program causing a computer to:
receive a first message at a first time from a source user;
receive a second message;
receive, from a second user, profile information;
associate the first message with identification information used to identify a destination user, wherein the destination user is an unregistered user who has not yet registered for a message exchange service at the first time, wherein the identification information includes main and auxiliary identification information;
record the first message and the identification information for later exchange;
accept profile information, at a time of a registration and responsive to a request from the second user, the second user wishing to use the message exchange service and proceeding with the registration of the second user to the message exchange service at a second time, wherein the profile information includes second identification information identifying the second user, and the time of the registration corresponds to the second time;
successfully match, responsive to the registration of the second user, the second identification information received from the second user at the time of the registration with the identification information used to identify the destination user, wherein the successfully match is performed by determining:
i) that the auxiliary identification information of the first message matches the profile information,
ii) that the auxiliary identification information of the first message matches the auxiliary identification information of the second message, and
iii) that the second user is an intended recipient of the second message; and
transmit, responsive to the registration of the second user and the successfully match and only if the registration has been performed, the first message and the second message to the second user, wherein the message is a recorded message.

10. The server device of claim 1, wherein the successful match is further based on a second matching of the identification information with a phonebook listing of the source user.

11. The server device of claim 1, wherein the successful match is further based on a third matching of a first device identifier associated with the message and a second device identifier associated with the registration.

12. The server device of claim 1, wherein the second identification information in the profile identifying the second user received from the second user at the time of the registration includes at least one of: i) a phone number of the second user, ii) a name of the second user, iii) a mail address of the second user, and iv) a birthday of the second user.

* * * * *